(12) United States Patent
Mahon, III et al.

(10) Patent No.: US 7,833,329 B2
(45) Date of Patent: Nov. 16, 2010

(54) PLENUM BASED HIGH PRESSURE BLOWBACK GAS DELIVERY SYSTEM IN A CONTINUOUS PROCESS FLOW FILTRATION SYSTEM

(75) Inventors: Edward F. Mahon, III, Weatogue, CT (US); Dennis J. Ogurick, Meriden, CT (US)

(73) Assignee: Mott Corporation, Farmington, CT (US)

( * ) Notice: Subject to any disclaimer, the term of this patent is extended or adjusted under 35 U.S.C. 154(b) by 518 days.

(21) Appl. No.: 11/744,138

(22) Filed: May 3, 2007

(65) Prior Publication Data
US 2008/0271607 A1  Nov. 6, 2008

(51) Int. Cl.
*B01D 46/04* (2006.01)
(52) U.S. Cl. .............................. 96/421; 55/283; 55/302; 95/280
(58) Field of Classification Search ................... 55/283, 55/302, 341.1; 95/280, 281, 279; 96/233, 96/428, 228, 425, 421
See application file for complete search history.

(56) References Cited

U.S. PATENT DOCUMENTS

| | | | | | |
|---|---|---|---|---|---|
| 4,149,863 | A | * | 4/1979 | Ballard | 55/379 |
| 6,022,388 | A | * | 2/2000 | Andersson et al. | 55/302 |
| 6,149,716 | A | * | 11/2000 | Bach et al. | 95/280 |
| 2006/0086071 | A1 | * | 4/2006 | Messina | 55/302 |
| 2007/0039290 | A1 | * | 2/2007 | Lee | 55/302 |

* cited by examiner

*Primary Examiner*—Duane Smith
*Assistant Examiner*—Minh-Chau Pham
(74) *Attorney, Agent, or Firm*—Wilmer Cutler Pickering Hale and Dorr LLP (57) ABSTRACT

A plenum based high-pressure blowback gas delivery system is provided. The system includes a filter vessel, divided into two portions, including and inlet and outlet for fluid. The system further includes a plurality of filter elements to filter fluid flowing from the first vessel portion into the second vessel portion. In response to a pressure differential caused by accretion of particulate matter on the filter elements a uniform flow of high-pressure blowback gas is delivered to the filter elements via nozzles attached to plenums contained within the second vessel portion.

26 Claims, 12 Drawing Sheets

PLENUM BASED HIGH PRESSURE BLOWBACK GAS DELIVERY SYSTEM IN A CONTINUOUS PROCESS FLOW FILTRATION SYSTEM

BACKGROUND

1. Field of Invention

This invention generally relates to systems for filtering particulate matter from gases. More particularly, the invention relates to improved methods and systems for supplying high-pressure blowback gas via a plenum to filter elements during the cleaning phase of a continuous process filtration system.

2. Description of Related Art

Many industrial processes require the ability to remove particulate matter from gases. Examples include removing carbon and ash from a combustion exhaust stream prior to using the exhaust stream in a turbine, the recovery of catalyst used in a crude oil refining and petrochemical processes, and even the recovery of aroma particles during the processing of coffee products. Filtration systems that remove particulate matter from gases generally operate in one of two basic modes, namely as trap filters or continuous process filters. In their typical operating mode both designs function in a similar fashion: gas flows through the filter media, which retains the particulate matter, while the cleaned gas passes through the filter element and is passed onto the next stage of the overall process. Over time, the particulate matter builds up on the filter element, as a permeable cake of particulate matter, and the filter element will eventually require cleaning.

Trap, or final, filters are used on basically clean streams of gas where the objective is the protection of downstream processes and equipment. These filters are not intended for in-situ cleaning, and removal of the particulate matter from the filter requires the shutdown of the process and disassembly of the filter assembly. The filter elements are generally cleaned using chemical or ultrasonic methods.

Continuous process filters are used on heavily particulate laden streams of gas. As noted above, over time the particulate matter builds up on the filter element. Eventually the cake of particulate matter on the filter element will restrict the flow of gas through the filter media to such a degree that the filter element will require cleaning. At this point, a flow of high pressure blowback gas is fed through the filter elements in the reverse direction from the normal flow of gas, which forces the cake of particulate matter off of the filter element. At this point the cake falls to the bottom of the filter assembly. When a sufficient amount of particulate matter has been collected the filtered material is removed (discharged) from the filter assembly.

The overall filtration process need not be stopped during the cleaning process. The high-pressure blowback gas can be passed through a manifold and set of header pipes. This allows the high-pressure blowback gas to be directed to subsets of filter elements for cleaning. The remaining filter elements continue to function normally, filtering the dirty gas. The blowback gas is sequentially directed at the filter elements, such that all the filter elements are cleaned during a cleaning cycle. During a cleaning cycle the overall gas filtration process is operating sub optimally, due to the reverse flow of high-pressure blowback gas through a subset of the filter elements. However, this is still more efficient than shutting down the overall gas filtration process entirely during a cleaning cycle.

BRIEF SUMMARY

The invention provides improved methods and systems for providing high-pressure blowback gas via a plenum to filter elements during the cleaning phase of a continuous process filtration system.

Under one aspect of the invention a plenum based high-pressure blowback gas delivery system includes a filter vessel includes a filter vessel, divided into two portions, including and inlet and outlet for fluid. The system further includes a plurality of filter elements to filter fluid flowing from the first vessel portion into the second vessel portion. In response to a pressure differential caused by accretion of particulate matter on the filter elements a uniform flow of high-pressure blowback gas is delivered to the filter elements via nozzles attached to plenums contained within the second vessel portion.

These and other features will become readily apparent from the following detailed description where embodiments of the invention are shown and described by way of illustration.

BRIEF DESCRIPTION OF THE SEVERAL VIEWS OF THE DRAWINGS

For a more complete understanding of various embodiments of the present invention, reference is now made to the following descriptions taken in connection with the accompanying drawings in which:

FIG. 1 is a perspective view, partly in cross section, of a down-flow gas filtration system in accordance with one or more embodiments of the invention.

FIG. 2 is an elevation view, partly in cross section, of the down-flow gas filtration system of FIG. 1.

FIG. 3 is a cross section view of a cylindrical filter element as a permeable cake of particulate matter is deposited during the filtration cycle and subsequently removed during the blowback process.

FIG. 5 is a perspective view of a tube sheet bundle frame.

FIG. 6 is a perspective view, partly in cross section, of the tube sheet bundle frame of FIG. 5.

FIG. 7 is a perspective view, partly in cross section, of a conventional top head bonnet assembly containing manifolds and header pipes.

FIG. 8 is a perspective view, partly in cross section, of a top head bonnet assembly in accordance with one or more embodiments of the invention.

FIG. 9 is an elevation view, partly in cross section, of the top head bonnet assembly of FIG. 8.

FIG. 10 is a perspective view of an internal head assembly, nozzle tubes, and nozzles in accordance with one or more embodiments of the invention.

FIG. 11 is a perspective view of the upper portion of the internal head assembly of FIG. 10.

FIG. 12 is a perspective view, partly in cross section, of the internal head assembly of FIG. 10.

DETAILED DESCRIPTION

Preferred embodiments of the invention provide improved methods and systems for supplying high-pressure blowback gas via a plenum to filter elements during the cleaning phase of a continuous process filtration system. In an illustrative embodiment, an accumulator tank supplies high-pressure blowback gas to a set of plenums and associated nozzle tubes. The nozzle tubes and nozzles are aligned with the cylindrical filter elements and direct choked flow high-pressure blowback gas into the interior of the filter elements. The choked flow of high-pressure blowback gas, along with additional flow induced through a venturi, provides a uniform cleaning pulse to each filter element.

The nozzle tubes are supplied with high-pressure blowback gas through a plenum, rather than header pipes and manifolds. The nozzle tubes, and therefore the filter elements, can be densely packed, as the geometry is not dependent on header pipes and manifolds. In addition to increased overall filter efficiency, manufacturing costs are reduced.

FIG. 1 is a perspective view, partly in cross section, of a down-flow gas filtration system 100. The down-flow gas filtration system includes a filter vessel 101 and a top head bonnet assembly 102, separated by a tube sheet 113.

The filter vessel 101 includes an inlet and tube assembly 103, a plurality of filter elements 104, an instrumentation and level detection port 111, and a solids discharge port 112. The filter vessel 101 construction details, such as size and material, are a function of the underlying industrial process. For example, the selection of the filter wall material and thickness will depend on the temperature, pressure, and corrosion properties of the gas being filtered. Exemplary materials include Inconel, carbon steel, and stainless steel. The diameter of the filter vessel can range from under one foot to over seven feet. At sizes less than one foot in diameter a blowback head is usually not used.

The construction of the filter elements 104, also known as candles, is again a function of the underlying industrial process. These elements can be sintered metal filters, ceramic tube filters, or even fabric candles. Filter elements are generally manufactured in sizes ranging from 1" to 6" outside diameter (OD) sizes.

The top head bonnet assembly 102 includes an outflow nozzle 105, an accumulator vessel 106, flanged nozzles 107, blowback valves 108, plenums 109, and nozzle tubes 110. The details of the top head bonnet assembly components will be described in more detail below when discussing FIGS. 8-12.

During normal operation unfiltered gas enters the interior of filter vessel 101 through the inlet and tube assembly 103 and passes through the plurality of filter elements 104. The particulate matter to be filtered builds up on the filter elements, while clean gas passes through the filter elements 104, through the tube sheet 113, and into the top head bonnet assembly 102. The clean gas exits the top head bonnet assembly 102 through the flanged nozzle exit 105. Over time, a permeable cake of particulate matter is retained on the surface of the filter media. The particle cake causes an additional pressure drop between the unfiltered and filtered gas, and this pressure drop increases as the particle cake depth increases. Well-known instrumentation is used to measure the pressure drop and, once a terminal pressure drop is reached, a blowback cleaning cycle is initiated.

During each blowback cleaning cycle, blowback valves 108 are sequentially opened and closed. Each blowback valves 108 is in fluid communication with the accumulator vessel 106 and a plenum 109, and high-pressure blowback gas is fed from the accumulator vessel 106 to the plenums 109 as each blowback valve 108 is cycled. The high-pressure blowback gas then passes through nozzle tubes 110, through filter elements 104, and into the interior of the filter vessel 101. As the gas passes through the inside of the filter elements 104, the particle cake is dislodged from the outside surface of the filter elements 104. The particle cake then falls to the bottom of the filter vessel 101. The filter vessel 101 includes an instrumentation and level detection port 111 that allows for the measurement of particulate matter at the base of the vessel. Once a sufficient buildup of matter is detected the particulate matter may be removed via solids discharge port 112.

FIG. 2 is an elevation view, partly in cross section, of the down-flow gas filtration system of FIG. 1. This figure better depicts the inlet and tube assembly 103, and the location of the outflow nozzle 105. In addition the alignment of individual nozzle tubes 110 directly above individual filter elements 104 can been seen.

FIG. 3 is a cross section view of a cylindrical filter element. Exemplary materials used to construct the filter elements include sintered metal powder media and sintered fiber metal media. Sintered metal powder media is available in different alloys, including 316L stainless steel, Inconel, and other alloys. Likewise sintered fiber metal media is available in different alloys, including 316L stainless steel. The selection of the type of media and material will depend on the temperature, pressure, and corrosion properties of the gas being filtered. During the filtration cycle, a permeable cake of particulate matter is deposited on the filter element 301. When a cleaning cycle is initiated a reverse flow of high-pressure gas forces the cake of particulate matter off of the filter element 302.

Figure 4:
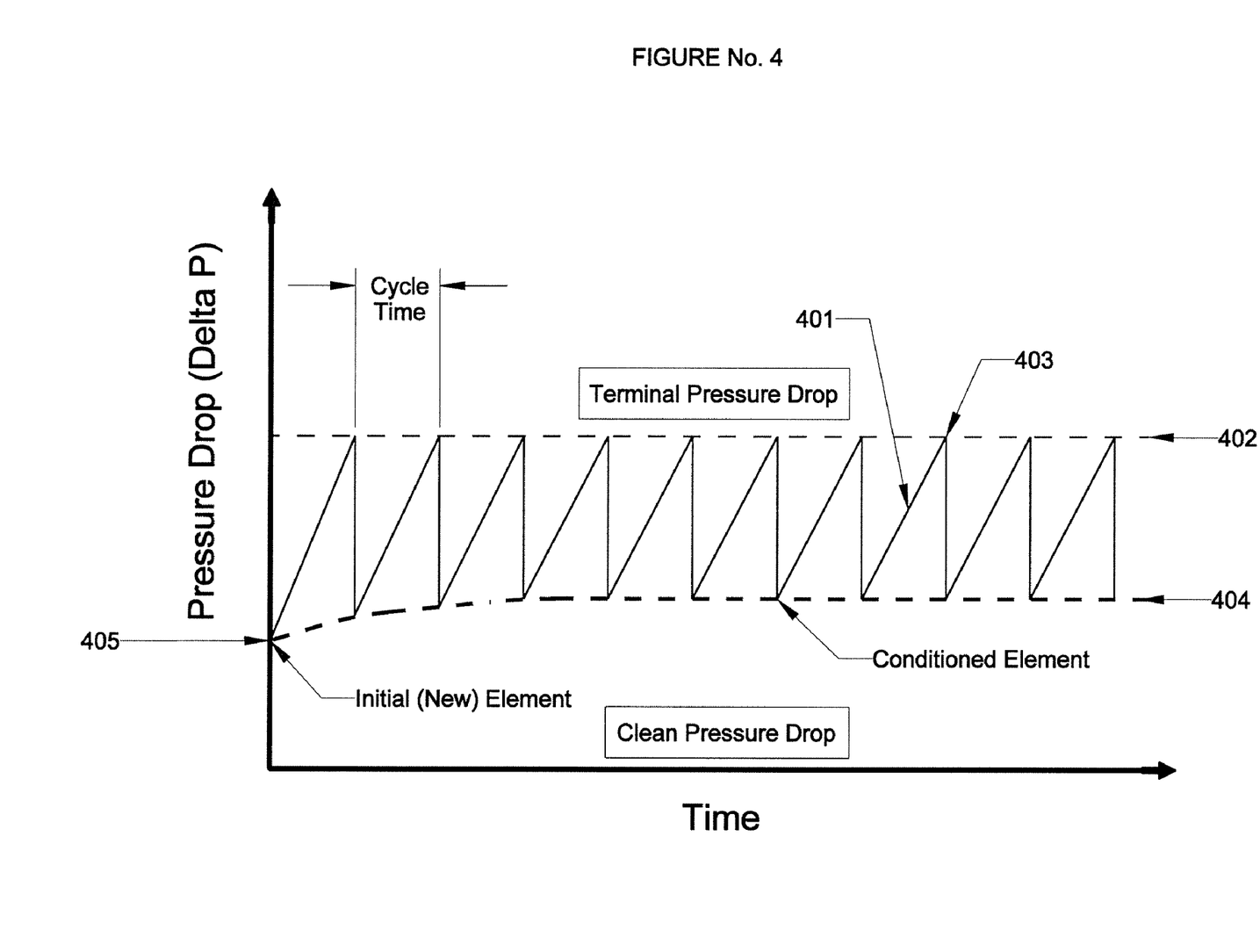
FIG. 4 is a graph showing the pressure drop over multiple cleaning cycles in a continuous process gas filtration system.

FIG. 4 is a graph showing the pressure drop in the gas filtration system over multiple cleaning cycles. The graph illustrates the pressure drop due to the particle cake buildup over time. As the particle cake develops on the surface of the filter media the pressure drop between the unfiltered and filtered gas increases 401. Once a predetermined pressure drop 402 is reached the blowback cleaning cycle is initiated 403 to clean the filter elements. During the cleaning cycle the permeable cake of particulate matter is blown off of the filter element, however some particles may become lodged within the porous filter media. The retention of some particles in the filter element results in a forward pressure drop 404 that is slightly above the pressure drop of a new filter element 405. This is shown on the graph as the nominal pressure drop for a conditioned element. The cleaning cycle may be initiated manually, automatically upon the detection of a terminal pressure drop, or by means of a pre-set timer.

FIG. 5 is a perspective view of a tube sheet bundle frame 500. The tube sheet bundle flame includes a tube sheet 113, a spider assembly 501, a plurality of filter elements 104, a plurality of support rods 502, and a plurality of separator plates (not shown). The material selected for the construction of the tube sheet 113, the spider assembly 501, and the support rods 502 will depend on the temperature, pressure, and corrosion properties of the gas being filtered. The tube sheet 113 forms the top of the tube sheet bundle frame and the spider assembly 501 forms the bottom of the tube sheet bundle frame. The support rods 502 provide structural support between the tube sheet 113 and the spider assembly 501.

Filter elements 104 are held vertically between the tube sheet 113 and the spider assembly 501. Individual filter elements are either welded or threaded to the tube sheet 113. The tube sheet 113 and the filter elements 104 form the boundary between the filter vessel 101 and the top head bonnet assembly 102, essentially separating the unfiltered gas from the filtered gas. Holes in the tube sheet 113 allow gas to flow through the filter elements and pass between the filter vessel 101 and the top head bonnet assembly 102. The placement of the holes within the tube sheet 113 will be described below.

FIG. 6 is an elevation view, partly in cross section, of the tube sheet bundle frame 500 of FIG. 5. This figure depicts additional elements of the tube sheet bundle frame 500 and filter elements 104 that cannot be seen in FIG. 5. Specifically, FIG. 6 shows venturi 601, separator plates 602, and pipe collars 603 and 604. Each individual filter element includes a venturi 601 positioned where the filter element is attached to the tube sheet 113. During the blowback portion of the cleaning cycle, the venturi 601 causes additional clean gas from the top head bonnet assembly 102 to be pulled into filter element along with the high-pressure blowback gas. This additional gas flow aids in the removal of the particle cake from the outside of each filter element. The venturi 601 are generally sized such that half of the gas used in the cleaning cycle is high-pressure blowback gas and half of the gas is pulled from the top head bonnet assembly 102. The increased cost of a filter element, due to the cost of machining the venturi, is offset by other manufacturing and operational savings. Without the venturi 601, approximately double the amount of high-pressure blowback gas is required, resulting in increased operational costs. In addition, the larger amount of high-pressure blowback gas requires a larger accumulator vessel 106, and an associated increase in manufacturing cost.

As filter elements are cleaned, particulate cake is expelled off the surface of the filter elements. Separator plates 602 are present between groups of filter elements to prevent the lateral movement of the expelled particulate cake, and to guide the particulate cake to the base of the filter vessel 101. This prevents the expelled particulate cake from interfering with, or being caught up in, the flow of gas to filter elements not currently being cleaned. The placement of groups of filter elements, and the associated separator plates, will be described in more detail below. Pipe collars 603 and 604 provide physical support for the tube sheet bundle within the filter vessel 101. The pipe collars 603 and 604 provide lateral support and stability for the inlet and tube assembly 103. The openings shown in pipe collar 604 allow the dirty gas to pass from the inlet and tube assembly 103 into the interior of the filter vessel 101.

FIG. 7 is a perspective view, partly in cross section, of a conventional top head bonnet assembly 700 containing manifolds 701. This figure shows the complex plumbing and numerous blowback valves 108 required to route high-pressure blowback gas from accumulator vessels 106 to manifolds 701. This results in increased manufacturing and operational costs.

FIG. 8 is a perspective view, partly in cross section, of a top head bonnet assembly in accordance with one or more embodiments of the invention. This Figure depicts the top head bonnet assembly 102 in more detail than FIG. 1. The top head bonnet assembly includes an accumulator vessel 106, flanged nozzles 107, blowback valves 108, and an interior head (unnumbered, see FIG. 10). The interior head includes a number of plenums 109. Each plenum 109 is an enclosed space bounded by the upper surface of the interior head 801, vertical partitions 802, and the lower surface of the interior head, also known as segment plates 803. Each segment plate 803 has holes to which the nozzle tubes 110 are connected. In the depicted embodiment, the interior head is divided into six pie shaped segments, each of which is a plenum 109. The number of plenums 109 is a design choice, and will be discussed in more detail below.

The accumulator vessel 106 is in fluid communication with the plenums 109 via flanged nozzles 107 and blowback valves 108. Each plenum 109 is also connected, via holes in each segment plate 803, to a subset of nozzle tubes 110. The nozzle tubes 110 terminate above holes cut in the tube sheet 113 to which filter elements 104 are attached. Individual nozzle tubes 110, holes cut in the tube sheet 113, and individual filter elements 104 are aligned vertically. The placement of the vertical partitions 802 and the holes in the segment plates 803 will be described in more detail below.

The accumulator vessel 106 must be sized to account for pressure losses during the cleaning cycle and the higher internal pressures that are therefore required earlier in the cleaning cycle. In addition the accumulator vessel 106 is generally sized such that an entire cleaning cycle may be completed before the accumulator vessel 106 needs to be recharged with new high-pressure blowback gas. This means that there should be sufficient high-pressure blowback gas in the accumulator vessel 106 to charge each of the plenums 109 in the internal head. For example, as a rule of thumb, the high-pressure blowback gas supplied to the filter elements should be at least 2.5 times the forward design pressure of the filter to cause choked flow of high-pressure blowback gas to occur during the cleaning cycle. As each plenum 109 is charged, in sequence, there will be a corresponding reduction in pressure of the gas within accumulator vessel 106 during that portion of cleaning cycle. The accumulator vessel 106 must be sized such that sufficient pressure remains, in this case 2.5 times the forward operating pressure, to charge the last plenum 109 during a cleaning cycle. This means that, taking into account the pressure drop through the cleaning cycle, the accumulator vessel 106 must be designed to withstand more than 2.5 times the forward operating pressure at the beginning of a cleaning cycle. In the depicted embodiment, the forward operating pressure can range from 4.2 psig to 25 psig. The accumulator vessel 106 is sized to withstand 110 psig. As the final plenum 109 is charged during a cleaning cycle, the pressure will have dropped below 110 psig, but will still be above 62 psig required to generate choked flow of the high-pressure blowback gas. Finally, the high-pressure blowback gas is either clean gas of the type being filtered, or is otherwise compatible with the gas being filtered. As an example, nitrogen could be used.

The blowback valves 108 are sized such that a closed-open-closed valve cycle can be completed in under approximately one second. This constrains the nozzle diameter to be under approximately 12", as this is the limit of current valve technology.

When using venturi 601 during a cleaning cycle, as discussed above, approximately half of the reverse flow entering a filter element is from the high-pressure blowback gas. The other half of the reverse flow is clean gas contained within the top head bonnet that is induced, via the venturi 601, to flow backwards through the filter. This flow of gas from the interior of the top head bonnet causes a pressure fluctuation within the top head bonnet and the downstream outlet pressure at the exit nozzle 105. To reduce the outlet pressure fluctuation, for example where a downstream portion of the overall process is sensitive to the outlet pressure, the interior volume of the entire top bonnet head assembly can be increased. To increase the interior volume, the segment plates 803 are placed at a larger vertical distance from the tube sheet 113. This distance determines the length of the nozzle tubes 110.

As described above, the accumulator vessel 106 holds the supply of high-pressure blowback gas. During a cleaning cycle each blowback valve 108 is opened in sequence, such that only a single plenum 109 is subject to the high-pressure blowback gas at any one point in time. As each plenum 109 is subject to the high-pressure blowback gas, the gas exits the plenum 109 and passes through a) a plurality of nozzle tube assemblies 110, b) through holes in the tube sheet 113, c) through venturi 601, and d) through filter elements 104. After blowback valve 108 is cycled, each of the remaining blowback valves are cycled in sequence, subjecting each plenum and the associated filter elements to the high-pressure blowback gas. Because each blowback valve 108 is opened in sequence, only a portion of the filter elements is subject to the high-pressure blowback gas at any one point in time. This allows the overall filtration process to continue, even during a cleaning cycle, using the remaining filter elements.

FIG. 9 is an elevation view, partly in cross section, of the top head bonnet assembly of FIG. 8. This figure more clearly shows the flow of high-pressure blowback gas from accumulator vessel 106 into plenums 109, through flanged nozzles 107 and blowback valves 108. In addition this figure shows that the high-pressure blowback gas flows vertically from accumulator vessel 106 into the open end of filter elements 104. This is an advantage over the conventional top head bonnet assembly, where losses are incurred as the high-pressure blowback gas must move horizontally down the manifolds 701 before entering the nozzle tube assemblies 110.

FIG. 10 is a perspective view of an internal head assembly, nozzle tubes, and nozzles in accordance with one or more embodiments of the invention. This figure shows the internal head assembly without portions being blocked by the surrounding top head bonnet assembly 102. In addition, the location of the nozzles 1001 on the end of the nozzle tube assemblies 110 can be seen. As described above, the internal head assembly is divided into plenums, each of which is bounded by the upper surface of the internal head 801, a segment plate 803, and vertical partitions (not shown). The nozzles 107 penetrate the upper surface of the internal head 801 and allow high-pressure blowback gas to enter the plenums. The segment plates 803 have holes, to which the nozzle tube assemblies 110 are attached. Each nozzle tube assembly 110 terminates with a nozzle 1001. The high-pressure blowback gas enters the plenums through the nozzles and exits the plenums through the nozzle tube assemblies.

The nozzles 1001 are generally sized to produce sonic or choked flow, i.e. where the volumetric flow rate of the high-pressure blowback gas flowing through the nozzle orifice will be independent of the downstream pressure on the outlet side of the nozzle. The mass flow rate will depend only on the temperature and pressure on the upstream side of the nozzle and on the size of the nozzle orifice opening. This allows the venturi to be sized to induce an additional mass flow of clean filtered gas from the interior of the top bonnet head assembly such that approximately two times the normal upstream mass flow is sent through the filter for cleaning purposes.

The use of the plenum, nozzle, and venturi design means that individual filter elements each receive a uniform flow of blowback gas. This leads to all filter elements being uniformly cleaned, increasing the efficiency of the overall filter. If, at the end of a cleaning cycle, an individual filter element had received less blowback gas then more of the caked particulate matter would remain on the filter element. This filter element would reduce the pressure drop through the overall filter and would itself reach the terminal pressure drop earlier than the other filter elements. The use of the nozzles sized for choked flow and venturi to induce additional gas is not required, but there would be an increase in consumption of the blowback gas, along with a decrease in cleaning efficiency of the filters.

The use of segment plates 803 as the base of the plenums allows for a densely packed geometry of nozzle tube assemblies 110 and filter elements. The segment plates 803 are flat, with holes to which the nozzle tube assemblies 110 are attached. The holes are easily machined, and the source of the high-pressure blowback gas in the plenum places no restriction on the geometry of the holes. This is unlike the manifolds 701 used in a conventional top head assembly. For 2.5" OD filter elements, a pitch of approximately $3^{1/8}$" is required when placing the holes in the segment plates 803. This accounts for the buildup of particulate matter on the filter elements during normal operation, and provides enough space to prevent cake bridging.

FIG. 11 is a perspective view of the upper portion of the internal head assembly of FIG. 10. This figure more clearly shows the location of the vertical plates 802 used to form the side walls of each plenum 109.

FIG. 12 is a perspective view, partly in cross section, of the internal head assembly of FIG. 10. This figure more clearly shows the vertical alignment of the holes in the segment plates 803 with the nozzle tube assemblies 110.

Additional Design Constraints

The selection of the size, number, and geometry of the plenums is influenced by many variables. The advantages to larger plenums include a decrease in material cost and increase utilization of space within the top head bonnet assembly. For example, fewer plenums means fewer vertical partitions 802 are required. This space may then be used for additional nozzle tube assemblies 110 and filter elements 104. In addition, fewer plenums means that fewer blowback valves 108 are required. The minimum number of plenums is generally four, however fewer plenums could be used with a decrease in overall filter efficiency. With four plenums, approximately 25% of the individual filter elements will be subject to the high-pressure blowback gas cleaning at any one point in time. If a larger percentage of filter elements were exposed to the blowback gas, the overall pressure drop through the system would increase. The limiting case would be a single plenum cleaning all the filter elements at the same time. In that case there would be no continuous filtering, as all the filter elements would be experiencing a reverse flow of blowback gas.

There are also advantages to smaller plenums. For example, during a cleaning cycle a portion of the high-pressure blowback gas is wasted. Before reaching approximately two times the working pressure of the filter, sonic or choked flow through the nozzles 107 has not been attained. Likewise, after the blowback valves have closed and the cleaning process has completed, the flow through the nozzles 107 will cease to be choked. As the plenum size is increased, the amount of wasted blowback gas at the beginning and end of each cleaning cycle increases, thereby increasing the overall operational cost.

As noted above, the plenums must be constructed to contain pressures approximately three times the design pressure of the filter, in order to generate a sufficient pressure gradient for the blowback gas. The added expense and complexity of an internal head assembly is generally justified, as the exterior wall of the top head bonnet assembly does not need to be constructed to withstand the blowback pressure. Even with the internal head assembly, the overall filter is still less complex than the manifold and header pipe solution of a conventional top head bonnet assembly.

The design pressure of the filter, the required blowback pressure, and the volume requirements of the individual plenums drive the choice of head used. The interior head is generally a 2 to 1 ellipsoidal head that can have thinner walls, for a given pressure. This is because the interior head must hold the high-pressure blowback gas as it passes through the plenums. In addition, for a given diameter, the 2 to 1 ellipsoidal head encloses approximately one third the volume of a hemispherical head. The larger volume of a hemispherical internal head would lead to an increase in wasted blowback gas, thereby increasing the overall operational cost. The top head bonnet assembly is generally a torispherical head, sometimes referred to as a flanged and dished head. This type of head assembly must have thicker walls than other types of heads, for a given pressure. However, this exterior head need only be sized for the design pressure of the filter, not the high-pressure blowback gas.

While the invention has been described with reference to specific embodiments, the description is illustrative of the invention and in not to be construed as limiting.

What is claimed is:

1. A plenum-based high-pressure blowback gas delivery system comprising:
    a filter vessel including and inlet and outlet for fluid;
    a tube sheet within the filter vessel dividing said filter vessel into a first vessel portion for unfiltered fluid and a second vessel portion, wherein the first vessel portion is in fluid communication with the inlet, wherein the second vessel portion is in fluid communication with the outlet, and wherein the second vessel portion encloses a plurality of plenums;
    a plurality of filter elements and venturis, attached to apertures in the tube sheet, through which the first vessel portion and the second vessel portion are in fluid communication;
    an instrumentation port to provide access for instrumentation to measure the pressure within the first vessel portion and the second vessel portion and to determine the pressure differential caused by accretion of particulate matter on the filter elements;
    a plurality of blowback valves, wherein each blowback valve is positioned between a source of high pressure blowback gas and a plenum and is controllably actuatable to open and closed states so as to provide and disrupt fluid communication between the source of high pressure blowback gas and the plenum;
    a plurality of nozzle tubes and nozzles within the second vessel portion aligned with the apertures in the tube sheet, wherein each plenum is in fluid connection with a subset of the nozzle tubes and nozzles; and
    wherein each plenum can independently deliver a surge of high-pressure blowback gas to the filter elements aligned with the associated subset of nozzle tubes and nozzles, and wherein each nozzle includes a nozzle orifice opening and is configured to provide a substantially uniform flow of high pressure gas from the plenum into each associated filter element, wherein the nozzles are sized to produce sonic or choked flow, and the mass flow rate depends only on the temperature and pressure on the upstream side of the nozzle and on the size of the nozzle orifice opening and is independent of the downstream pressure on the outlet side of the nozzle.

2. The system of claim 1 wherein the filter elements are cylindrical having a closed bottom and side walls and an open top and wherein the open top is attached to the apertures in the tube sheet.

3. The system of claim 1 wherein the structure enclosing each plenum does not include the outer wall of the second vessel portion.

4. The system of claim 1 wherein the structure enclosing each plenum includes the outer wall of the second vessel portion.

5. The system of claim 1 wherein the second vessel portion encloses an upper surface plate, a plurality of segmented plates, and a plurality of plates perpendicular to the segmented plates, and wherein each plenum is defined by the upper surface plate, a segmented plate, and at least two plates perpendicular to the segmented plate.

6. The system of claim 1 wherein the second vessel portion encloses a plurality of segmented plates and a plurality of vertical plates, and wherein each plenum is defined by the interior wall of the second vessel portion, a segmented plate and at least two plates perpendicular to the segmented plate.

7. The system of claim 1 wherein the number of plenums is between 3 and 12, inclusive.

8. The system of claim 1 wherein the first vessel portion and the plurality of filter elements are configured as a down-flow gas filtration system.

9. The system of claim 1 wherein the first vessel portion and the plurality of filter elements are configured as an up-flow gas filtration system.

10. The system of claim 1 wherein the apertures are placed in an geometric pattern in the tube sheet, said pattern comprising one of equally spaced triangular, rectangular, circular, or radial.

11. The system of claim 1 wherein the nozzle tubes and nozzles have a defined shape in relation to the high pressure blowback gas and the pressure of the high pressure blowback gas is sufficient to cause substantially choked flow through the nozzles in fluid connection with the plenum.

12. The system of claim 1 wherein the nozzle tubes and nozzles have a defined shape in relation to the high pressure blowback gas and the pressure of the high pressure blowback gas is sufficient to cause a mass flow rate of at least 90% of choked flow through the nozzles in fluid connection with the plenum.

13. The system of claim 1 wherein the nozzle tubes and nozzles have a defined shape in relation to the high pressure blowback gas and the pressure of the high pressure blowback gas is sufficient to cause a mass flow rate of at least 70% of choked flow through the nozzles in fluid connection with the plenum.

14. A plenum-based high-pressure blowback gas delivery system comprising:
    a top head bonnet assembly including, a tube sheet and an outlet for fluid, wherein the top head bonnet assembly encloses a plurality of plenums;
    an instrumentation port to provide access for instrumentation to measure the pressure within the top head bonnet assembly and to determine the pressure differential caused by accretion of particulate matter on the filter elements;
    a plurality of filter elements and venturis, attached to apertures in the tube sheet, through which the exterior of the top head bonnet assembly is in fluid communication with the interior of the top head bonnet assembly;
    a plurality of blowback valves, wherein each blowback valve is positioned between a source of high pressure blowback gas and a plenum and is controllably actuatable to open and closed states so as to provide and disrupt fluid communication between the source of high pressure blowback gas and the plenum;
    a plurality of nozzle tubes and nozzles within the top head bonnet assembly aligned with the apertures in the tube sheet, wherein each plenum is in fluid connection with a subset of the nozzle tubes and nozzles; and
    wherein each plenum can independently deliver a surge of high-pressure blowback gas to the filter elements aligned with the associated subset of nozzle tubes and nozzles, and wherein each nozzle includes a nozzle orifice opening and is configured to provide a substantially uniform flow of high pressure gas into each associated filter element, wherein the nozzles are sized to produce sonic or choked flow, and the mass flow rate depends only on the temperature and pressure on the upstream side of the nozzle and on the size of the nozzle orifice opening and is independent of the downstream pressure on the outlet side of the nozzle.

15. The system of claim 14 wherein the filter elements are cylindrical having a closed bottom and side walls and an open top and wherein the open top is attached to the apertures in the tube sheet.

16. The system of claim 14 wherein the structure enclosing each plenum does not include the outer wall of the second vessel portion.

17. The system of claim 14 wherein the structure enclosing each plenum includes the outer wall of the second vessel portion.

18. The system of claim 14 wherein the top head bonnet assembly encloses an upper surface plate, a plurality of segmented plates, and a plurality of plates perpendicular to the segmented plates, and wherein each plenum is defined by the upper surface plate, a segmented plate and two plates perpendicular to the segmented plate.

19. The system of claim 14 wherein the top head bonnet assembly encloses a plurality of segmented plates and a plurality of plates perpendicular to the segmented plates, and wherein each plenum is defined by the interior wall of the top head bonnet assembly, a segmented plate and two plates perpendicular to the segmented plate.

20. The system of claim 14 wherein the number of plenums is between 3 and 12, inclusive.

21. The system of claim 14 wherein the top head bonnet assembly and the plurality of filter elements are configured as a down-flow gas filtration system.

22. The system of claim 14 wherein the top head bonnet assembly and the plurality of filter elements are configured as an up-flow gas filtration system.

23. The system of claim 14 wherein the apertures are placed in an geometric pattern in the tube sheet, said pattern comprising one of equally spaced triangular, rectangular, circular, or radial.

24. The system of claim 14 wherein the nozzle tubes and nozzles have a defined shape in relation to the high pressure blowback gas and the pressure of the high pressure blowback gas is sufficient to cause substantially choked flow through the nozzles in fluid connection with the plenum.

25. The system of claim 14 wherein the nozzle tubes and nozzles have a defined shape in relation to the high pressure blowback gas and the pressure of the high pressure blowback gas is sufficient to cause a mass flow rate of at least 90% of choked flow through the nozzles in fluid connection with the plenum.

26. The system of claim 14 wherein the nozzle tubes and nozzles have a defined shape in relation to the high pressure blowback gas and the pressure of the high pressure blowback gas is sufficient to cause a mass flow rate of at least 70% of choked flow through nozzles in fluid connection with the plenum.

* * * * *